United States Patent [19]

Anderson

[11] 4,198,037
[45] Apr. 15, 1980

[54] METHOD OF MAKING POLYESTER ELASTOMER COMPRESSION SPRING AND RESULTING PRODUCT

[75] Inventor: David G. Anderson, Chesterton, Ind.
[73] Assignee: Miner Enterprises, Inc., Geneva, Ill.
[21] Appl. No.: 861,827
[22] Filed: Dec. 19, 1977

Related U.S. Application Data

[63] Continuation-in-part of Ser. No. 755,050, Dec. 28, 1976, abandoned.

[51] Int. Cl.² .............................................. B61G 9/06
[52] U.S. Cl. ......................................... 267/153; 213/7; 264/235; 264/248; 264/265; 264/325; 264/346; 267/63 R
[58] Field of Search ............... 264/325, 273, 346, 241, 264/235, 248–249, 265, 274; 213/22, 7; 267/153, 63 R

[56] References Cited

U.S. PATENT DOCUMENTS

| | | | |
|---|---|---|---|
| 2,395,300 | 2/1946 | Slauson | 264/249 |
| 2,549,144 | 4/1951 | Truscott | 264/325 |
| 2,713,483 | 7/1955 | Tillou | 267/63 R |
| 3,227,288 | 1/1966 | Mulcahy et al. | 213/45 |
| 3,279,048 | 10/1966 | Grove et al. | 264/273 |
| 3,651,014 | 3/1972 | Witsiepe | 260/40 R |
| 3,741,406 | 6/1973 | Anderson | 213/22 |
| 3,763,109 | 10/1973 | Witsiepe | 260/40 R |
| 3,766,146 | 10/1973 | Witsiepe | 260/75 R |
| 3,862,288 | 1/1975 | S u | 264/235 |

FOREIGN PATENT DOCUMENTS

| | | |
|---|---|---|
| 668987 | 6/1934 | Fed. Rep. of Germany . |
| 734506 | 8/1955 | United Kingdom . |
| 797164 | 6/1958 | United Kingdom . |
| 990734 | 4/1965 | United Kingdom . |

*Primary Examiner*—Jeffery R. Thurlow
*Attorney, Agent, or Firm*—Darbo & Vandenburgh

[57] ABSTRACT

A preform is made by casting a copolyester polymer elastomer into a block. While the block is solidifying, pressure is supplied to the central portion thereof. After a block is formed, it is annealed and a precompression force is applied thereto sufficient to compress the block to an extent greater than thirty percent of the original dimension of the block as measured parallel to the precompression force. In one embodiment a cushioning unit using the block is made by placing a pair of multi-apertured metal plates on opposite sides of the block with projections on the plates extending against the block and applying a second precompression force to the block and plates sufficient to cause the copolyester polymer elastomer to flow into the apertures in the plates and form a mechanical bond between the block and the plates.

15 Claims, 14 Drawing Figures

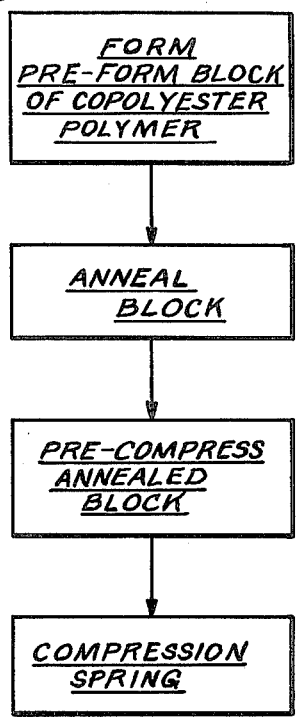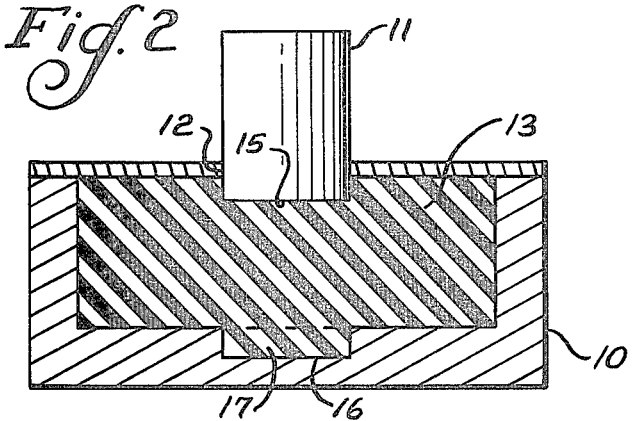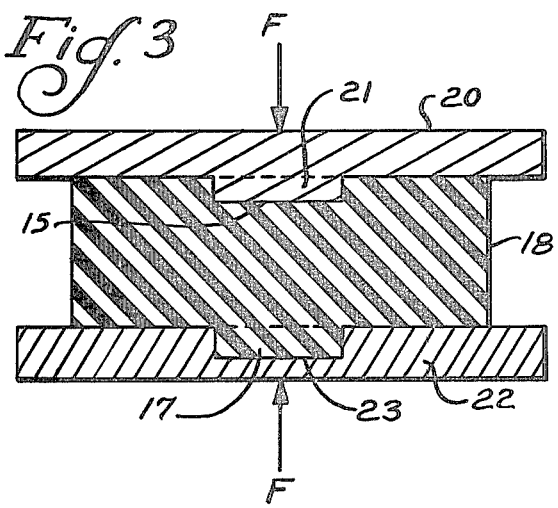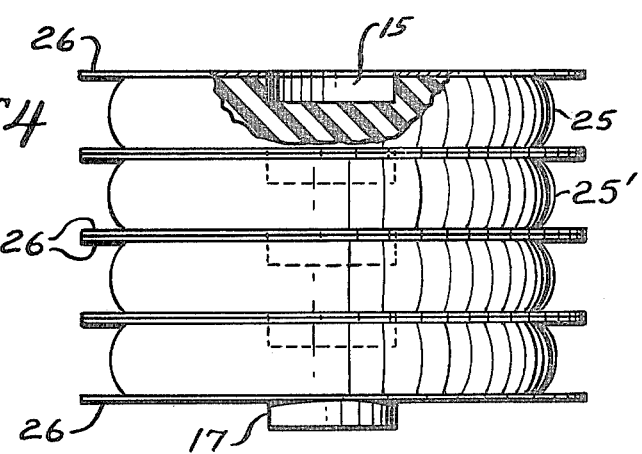

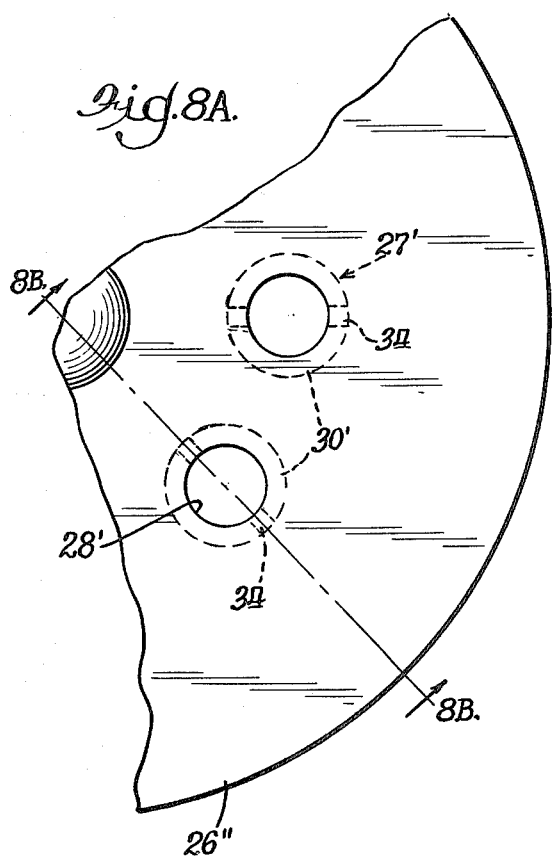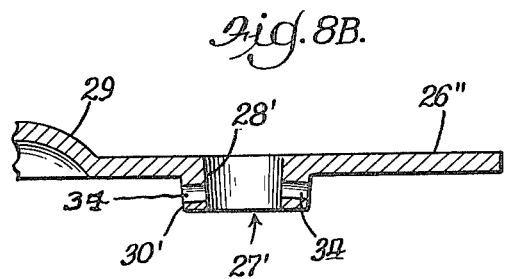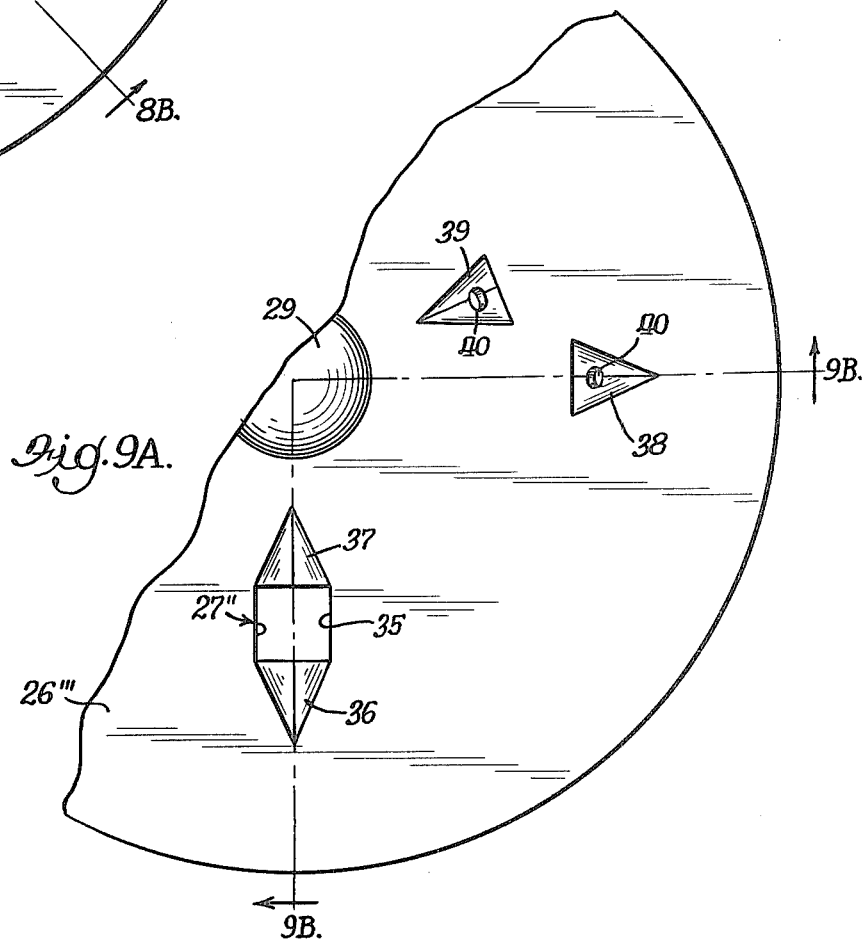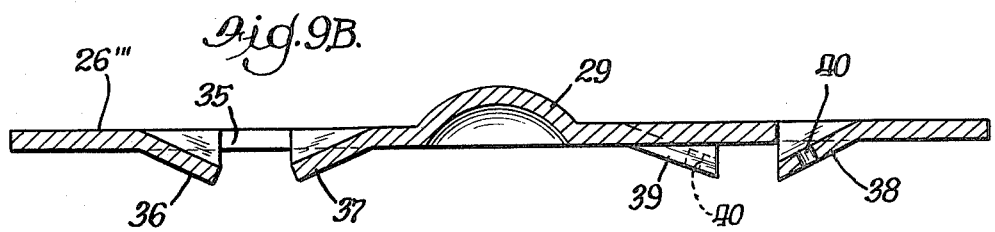

METHOD OF MAKING POLYESTER ELASTOMER COMPRESSION SPRING AND RESULTING PRODUCT

RELATED APPLICATION

This application is a continuation-in-part of my pending application Ser. No. 755,050, filed Dec. 28, 1976 now abandoned.

BACKGROUND AND SUMMARY OF THE INVENTION

Elastomers have been widely used as springs, both in tension and in compression. One of the more recent elastomers is a copolyester polymer. They can broadly be described as randomly joined soft and hard segments. They are well known and are described, among other places, in U.S. Pat. Nos. 3,763,109, 3,766,146 and 3,651,014. One such polymer, sold under the trademark HYTREL is made from three ingredients, namely, (1) dimethyl terephthalate, (2) polyglycols such as polytetramethylene ether glycol, polyethylene ether glycol or polypropylene ether glycol, and (3) short chain diols like butanediol and ethylene glycol. When these are reacted to form high molecular weight polymers the diol/terephthalate blocks form crystalline hard segments, and the softer amorphous phase contains units of ether glycol terephthalate. In actual practice I have used HYTREL 5550, 5555, 5556, 5556HS, 4056 and 6356. The first two numbers of these compositions signify the durometer hardness on the D scale.

Such copolyester polymers act suitably when employed as tension springs. However, they have proven to be quite unsuitable for use as compression springs. This is due to the fact that when compressed over about ten percent they commence taking on a permanent set. Obviously, a spring that permanently deforms under load is quite unsuitable for the intended purpose. The applications in which the spring will not be compressed over about ten percent are quite limited (i.e., little spring action is required).

The principal object of the present invention is to provide a method by which such copolyester polymer elastomers may be processed to produce a product which will serve as a compression spring in applications wherein the force applied to the spring is such as to compress the spring significantly over ten percent. Alternatively stated, the object is to produce a copolyester polymer compression spring which will not take a significant permanent set when operating under conditions such that the spring is compressed substantially over ten percent. In accordance with the present invention, this is achieved by annealing a block of the copolyester polymer elastomer and then precompressing that block by applying a force to the block sufficient to compress the block an extent greater than thirty percent of its previous dimension measured in the direction of the applied pressure.

One use for elastomeric springs has been in railroad draft gears. In such applications it is known to use metal plates bonded to each side of the elastomeric pad and thereby obtain substantially improved work capacity from the pad. See for example U.S. Pat. Nos. 2,713,483 and 3,227,288. With the elastomeric materials commonly employed in the past a good bond between the pad and a metal plate can be obtained with commercially available adhesives. However, it has not been possible to find an adhesive that will adequately bond to the copolyester polymers referred to above.

In one embodiment, a copolyester polymer compression cushioning unit is constructed in accordance with the invention by placing a pair of multi-apertured plates on opposite sides of an initially precompressed block and applying a second precompressive force to the block and plates sufficient to cause the copolyester polymer to flow into the apertures in the plates and form a mechanical bond between the block and the plates. The plates may be formed with projections adjacent the apertures to enhance the mechanical bond between the plates and the block when the spring unit is assembled. To additionally increase the force capacity of such an elastomeric spring, the faces of the plates bearing against the pad are roughened, as by means of sandblasting.

Other features of the invention will be ascertained from the following description.

DESCRIPTION OF THE DRAWINGS

FIG. 1 is a flow chart which illustrates the method of forming a compression spring of a copolyester polymer elastomer in accordance with the present invention;

FIG. 2 is a section through a mold in which the block of copolyester polymer is being cast;

FIG. 3 is a diagrammatic illustration of the step of precompressing the annealed block;

FIG. 4 is an elevational view of the resulting compression spring;

FIG. 8A is a fragmentary top plan illustration of an alternative embodiment to the plate of FIG. 5;

FIG. 8B is a cross-sectional view taken along lines 8B—8B of FIG. 8A;

FIG. 9A is a fragmentary top plan illustration of another alternative embodiment to the plate of FIG. 5;

FIG. 9B is a cross-sectional view taken along lines 9B—9B of FIG. 9A;

DESCRIPTION OF SPECIFIC EMBODIMENT

Figure 5:
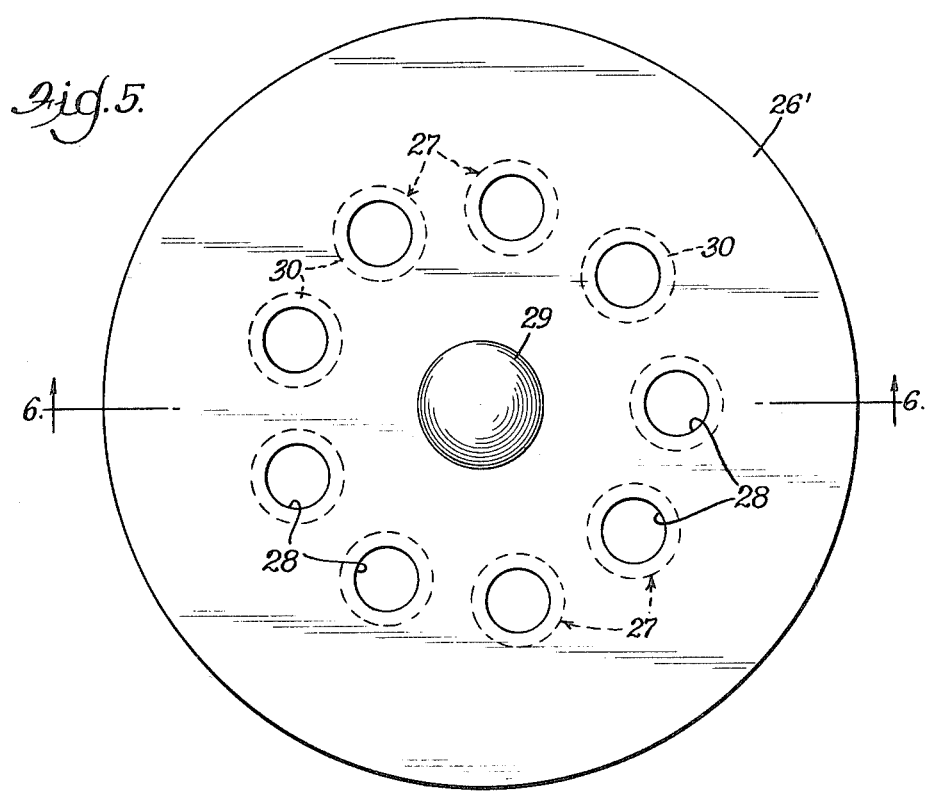
FIG. 5 is a top plan illustration of one plate of a pair of metal plates used to form a cushioning unit in combination with the block of copolyester polymer elastomer.

The copolyester polymers previously referred to commonly come in a pellet form for use in casting or extruding. As shown at the top of FIG. 1, the initial step is to form a preform block of the material. With small sections this might be done by extruding a rod of the material and cutting the rod into individual blocks. For large sections the size and capacity of the required extrusion equipment becomes unreasonable and the casting of such sections is more practical.

For casting purposes, the pellets are rendered molten by heating to 330°–450° F. (165°–232° C.). Such molten material is deposited in a mold 10 and while the copolyester polymer is solidifying an external pressure is applied to the material. The pressure is applied to the central area of what is to be the cast block. Thus, in FIG. 2 a weight 11 extends through a central opening 12 in the top of the mold 10 and is free to move through that opening in a vertical direction. Thus, this weight applies pressure to the central area of the copolyester polymer material 13, which is in the process of solidifying in the mold. The pressure force could be obtained by other means, e.g., springs, as an alternative to gravity acting on a weight. Also the pressure could be applied to other faces, and not necessarily to a limited part of the face area.

The principal purpose for applying this pressure while the material is solidifying is to eliminate, or at least ameliorate, the problem of voids within the resulting block. When thick sections of the copolyester polymer are cast it is quite common for such voids to occur. This is due to the fact that (1) the central portion of the material in the mold will remain molten after solidification of the exterior portions, and (2) the material shrinks as it cools. Thus, the exterior shape is initially established and as the central material thereafter solidifies within that established shape, the shrinkage of the central material as it solidifies results in the occurrence of voids. Such voids will remain in the finished spring and are detrimental thereto. By applying pressure as above described, the voids will occur very seldom, if ever.

A secondary advantage achieved by this pressure applied to the top of the material is that the weight 11 defines a socket 15 in the end of the block of solidified material. In some applications a plurality of elastomeric springs are employed in a stacked series, as for example in the spring of a railroad car draft gear. The adjacent spring has a protrusion of corresponding configuration which projects into the socket. Thereby the springs are held in alignment. In the mold of FIG. 2, there is a depression 16 in the base of mold 10. The molten material fills this depression and forms a protrusion 17 on the end of the block of material. Of course, the protrusion 17 is of a size to fit into the socket 15 of an adjacent spring.

As illustrated in FIG. 1, after the material has been molded into a block, such as 18, it is annealed. The temperature employed will vary with the particular material employed, but for HYTREL 5550 it will be about 250° F. (121° C.) for a period of about at least sixty-four hours. I have annealed for as long as one hundred eighty hours and feel that the characteristics are somewhat better. A lesser period of annealing may be used, but I believe that the characteristics of the finished spring are better if the annealing time is at least fifty hours. It seems that the longer annealing results in a finished spring that is more resilient, i.e., the finished spring recovers its shape better when the spring load is relieved. I am not sure as to what occurs during annealing, but I am under the belief that there is a crystal growth as a result of the annealing. I believe that the annealing should be performed shortly after the blocks are cast.

Again with reference to FIG. 1, the next step in the process is to precompress the annealed block. This is performed in the manner illustrated diagrammatically in FIG. 3. A plate 20 is positioned at one side of the annealed block 18. This plate has a protrusion 21 of a size to fit within socket 15 to maintain the shape of the socket. At the opposite face of the block is a plate 22 having a depression 23 sized to receive and maintain the shape of protrusion 17 of the block. A force F is applied to the two plates in a sense such as to cause compression of the block. I believe that this force should be sufficient to compress the block in an axial direction to an extent such that the size of the block in the axial direction is reduced by at least thirty percent. The axis referred to in using the term axial direction is the axis which is normal to the two block faces contacted by plates 20 and 22. Better results in the finished spring are obtained if the amount of compression is substantially greater. My tests to date indicate that the optimum precompression, all factors considered, is about fifty percent. In terms only of the resiliency of the finished spring, the characteristics of the elastomer are even better if the precompression is in the range of 90–94%. However, this is not generally very practical because the axial length of the preform block necessary to obtain that amount of precompression necessarily is long and the block prior to precompression constitutes a column. Such a column is difficult to precompress. If it is not of columnar configuration, but has a substantial cross-sectional size as viewed normal to the axis, the force required to obtain the precompression of 90–94% over such a large cross-sectional area becomes astronomically large.

The precompression need not be maintained for any substantial period of time. In my work to date I have performed the precompression in a press. The press is operated in a direction forcing plates 20 and 22 toward each other. When the desired amount of precompression is reached, the press is stopped and reversed to release the force F from the block and release the block for removal. Thus the force F is applied only for such time as has been required to stop and reverse the press. I believe that substantially the same results would be obtained by applying the force F by means of a momentarily applied impact, however, I have not attempted to do this.

Four of the resulting springs 25 and 25' are illustrated in FIG. 4. The load faces of each spring have metal plates 26 bonded thereto, as by means of an adhesive if a suitable adhesive can be obtained. Each has a socket 15 and a protrusion 17. As shown, the protrusion of spring 25 is seated in the socket of spring 25'.

Of course, the socket 15 and the protrusion 17 are not an essential part of producing a spring. Thus the mold need not have the depression 16. In that event, and if the plates 20, 22 are completely flat (without protrusion 21 and depression 23) the load faces of the resulting spring (to which faces the plates 26 are bonded in FIG. 4) will be entirely flat. While the weight 11 will still have formed a depression in the top of the preform, that depression will have disappeared as a result of the precompression step.

The resulting elastomeric springs can be used with favorable results as the springs in draft gears. For example, see the draft gear illustrated in U.S. Pat. No. 3,741,406 employing elastomeric springs. Other applications would be as crane bumpers, automobile bumpers, shock absorbers employed in conjunction with transfer conveyors, pads under machines for mitigating the transfer of shocks generated by such machines during their operation, etc.

I have found that it often is difficult to obtain a good adhesive bond between the springs 25 and the plates 26 due to the inability of available adhesives to adhere to the copolyester polymer elastomer. Since, when the springs are used in draft gears, it is important to securely bond the plates to the springs, I have developed a relatively simple procedure for obtaining a mechanical bond between the springs and the plates. To do this I form the plates with surface incongruities at the face thereof which is to be in contact with the spring, which incongruities define abutments or steps which are angularly aligned with respect to the face. These incongruities can be apertures in the plates, outwardly projections from the face of the plate, or both. The assembly of the plates and the precompressed spring is then compressed a second time sufficient to cause the copolyester polymer to flow about said incongruities and against said abutments or steps.

Figure 6:
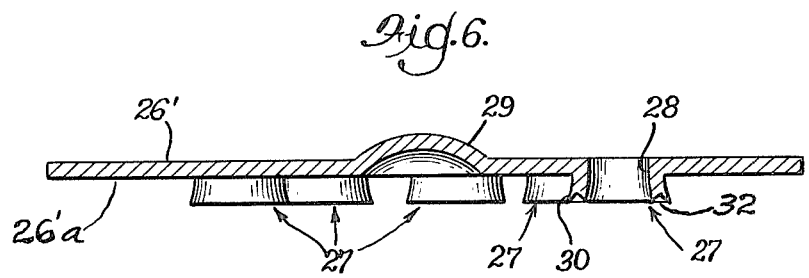
FIG. 6 is a cross-sectional view taken along lines 6—6 of FIG. 5.

One embodiment is illustrated in FIGS. 5 and 6. A metal plate 26' is provided with surface incongruities generally 27 and which are stamped from or die cast with the plate 26'. The plate also includes a protrusion 29 which is semi-spherical rather than cylindrical as is the protrusion 17 of FIG. 4, although performing the same function.

The incongruities 27 each include an annular projection 30 extending outwardly and an aperture 28 through the projection and plate. The projections 30 may be continuous, integral portions of the plate 26', as illustrated, or may be composed of plural sections, and may be welded or otherwise bonded to the plate 26' rather than integrally formed as by means of a punching operation.

I prefer that the projections 30 may be splayed slightly outwardly at their outer tips 32 as shown to help strengthen the mechanical bond. The tips may also be cut and bent to produce a rough edge similar to that illustrated.

Nine bonding elements 27 are depicted in FIG. 5, equi-angularly spaced at the same radial distance from the protrusion 29. The number and spacing of the elements 27 necessarily must vary depending on the size of the plate 26' and the ultimate use of the plate.

About each opening 28 the metal of the plate 26' and of projection 30 defines an abutment or step angularly aligned with respect to face 26'a of the plate, the face 26'a being the one that will be in contact with the elastomeric spring. Similarly, the periphery of the projection 30 defines such an angularly aligned face or step.

Figure 7:
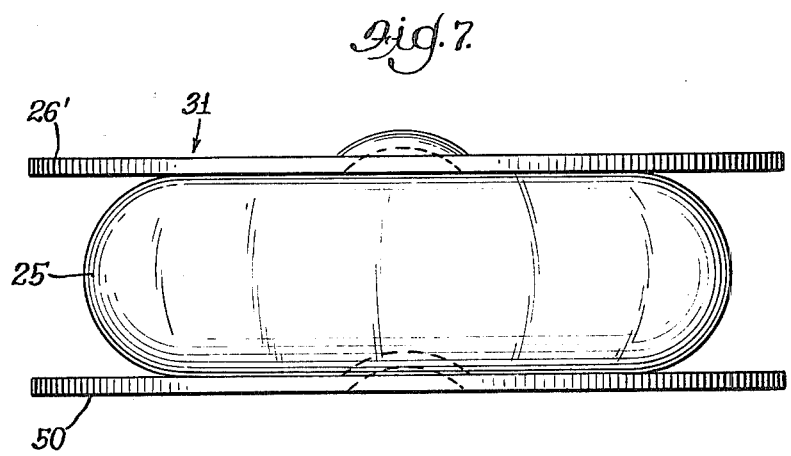
FIG. 7 is an elevational view of the resulting cushioning unit.

To form a cushioning unit or assembly 31, a block of the copolyester polymer is cast in the form of a cylinder, without the socket 15 and the protrusion 17. It is annealed and then prepressed, as illustrated diagrammatically in FIG. 3, between an opposed pair of flat surfaces (i.e., without the protrusion 21 and depression 23). Again, this precompression should be in excess of thirty percent of the length of the block as cast. After the precompression, it is placed between a pair of plates. The top plate illustrated in FIG. 7 is the plate 26' illustrated in FIGS. 5 and 6. The lower plate 50 is identical thereto except that the projections 30 extend from the opposite face thereof, i.e., toward the precompressed block. A second compressive force F' is applied axially to the unit or assembly formed by the plates and block, the force being of sufficient strength to cause the copolyester polymer elastomer to flow around the projections 30, into the apertures 28 and into contact with the angularly aligned faces. In practice I have caused this second compression to be sufficient to reduce the assembly to the same thickness to which it was compressed during the first precompression step. After the removal of each precompression force it recovers somewhat in thickness. Generally, I have found the required magnitude of the force F' to be greater than that of the force F used to first compress the block 18.

For example, using an uncompressed block of copolyester polymer having a diameter of 3.4 inches (86.36 m.m.) and a length of 3.4 inches, sufficient precompression force is applied to reduce its length to 1 inch (25.4 m.m.). This requires a total force of about 200,000 to 220,000 pounds. When this precompression force is removed the block recovers to a length of about 2 inches (50.8 m.m.). After the plates have been positioned against the opposite faces of the block, the assembly is precompressed a second time to an extent such that the length of the assembly again is 1 inch. This requires a total force of about 240,000 to 250,000 pounds. It is during this second precompression that the plates become locked to the elasomeric spring. When the force is again removed, the length of the assembly is again about 2 inches.

Because of limitations imposed by the apparatus available to me, I have followed the practice of forming the cushioning units 31 in two steps, as described above; that is, a precompression step to produce the elastomeric spring, followed by a compression step to bond that spring to the plates. However, with suitable equipment it would be possible to combine these two steps into a single operation. Thus the annealed block of copolyester polymer, yet unpressed, would be placed between two plates (such as 26' and 50) and a compressive force applied to the assemblage sufficient to compress the block in excess of thirty percent of its original length. This single compression step would act both (1) to change the character of the copolyester polymer to render it suitable for a compression spring, and (2) to cause the copolyester polymer to flow around the projections (e.g. 30) and into the apertures (e.g. 28) to obtain the mechanical bond between the polymer and the plates.

In practice, when forming a cushioning unit 31, I have found it preferable to roughen the surfaces of the plates 20, 22, 26' and 50 which contact the block 18 in order to help prevent the block from flowing along the plates. Roughening can be accomplished by sandblasting the plate surfaces. Roughening of the plates is a means with which to gain force control of the resulting compression spring. Roughened plates contain the block, resulting in a compression spring of greater compressive strength.

The copolyester polymer elastomer material of the block 18 is "velocity sensitive"; that is, momentary compression of the resulting spring (as occurs in spring action) will not result in permanent deformation.

I presently regard plates according to FIGS. 5 and 6 to be the most preferable, all things considered. That is, consideration must be given to the practical aspects of cost, manufacturing techniques, etc., as well as the best possible surface incongruities used to obtain the mechanical bond between the plates and the elastomeric spring.

However, other configurations of a mechanical lock may be employed in the invention. Shown in FIGS. 8A and 8B is an alternative configuration for the plate. Here the plate 26' has surface incongruities, generally 27', each comprising an aperture 28' and an outwardly extending projection 30'. Projections 30' define steps or abutments angularly disposed to the face of the plate. Projection 30 has two or more perforations 34 formed therein. When the plate is used to construct a cushioning unit 31, as shown in FIG. 7, the compressive force F' causes the copolyester polymer elastomer to flow into and around the projections 30' and into the perforations 34. The elastomeric material which extends into perforations 34 aids in maintaining the finished assembly of the plates and pad. A similar effect is achieved by reason of the tapering of the walls that define opening 28'.

In FIGS. 9A and 9B I have illustrated other alternative configurations for obtaining the surface incongruities. At the surface incongruity 27" there is a generally square aperture 35 in the plate 26'". At opposite sides of this opening are triangular depressions defined by projections 36 and 37 in the plate. Plate 26'" would have a plurality of such surface incongruities 27" spaced thereabout. When the plate is used to construct the cushioning unit 31 of FIG. 7, the copolyester polymer elastomer flows into the aperture 35 and into the depressions defined by projections 36 and 37 to achieve a mechanical lock. The sides of the opening and the projections 36 define steps or abutments angularly disposed to the face of the plate that will contact the elastomeric spring.

I have also shown in this embodiment a variation in which the aperture 35 is omitted and the projections 36 and 37 are replaced respectively by projections 38 and 39. One or more perforations 40 may be located in each of the projections 38 and 39 to enhance the mechanical lock between the plate 26' and spring 25 when the cushioning unit 31 of FIG. 7 is assembled. Although the projections 38 and 39 have been shown angularly spaced from one another, they can be radially aligned as are the projections 36 and 37. Of course, a plurality of such surface incongruities would be employed.

Other similar surface incongruities may be formed in or attached to the plates and utilized to engage the spring 25 to form a secure, mechanical bond to the plates 26' and 26" when forming a cushioning unit or assembly 31. The various embodiments of FIGS. 5 through 9 are illustrative only.

Figure 10A:
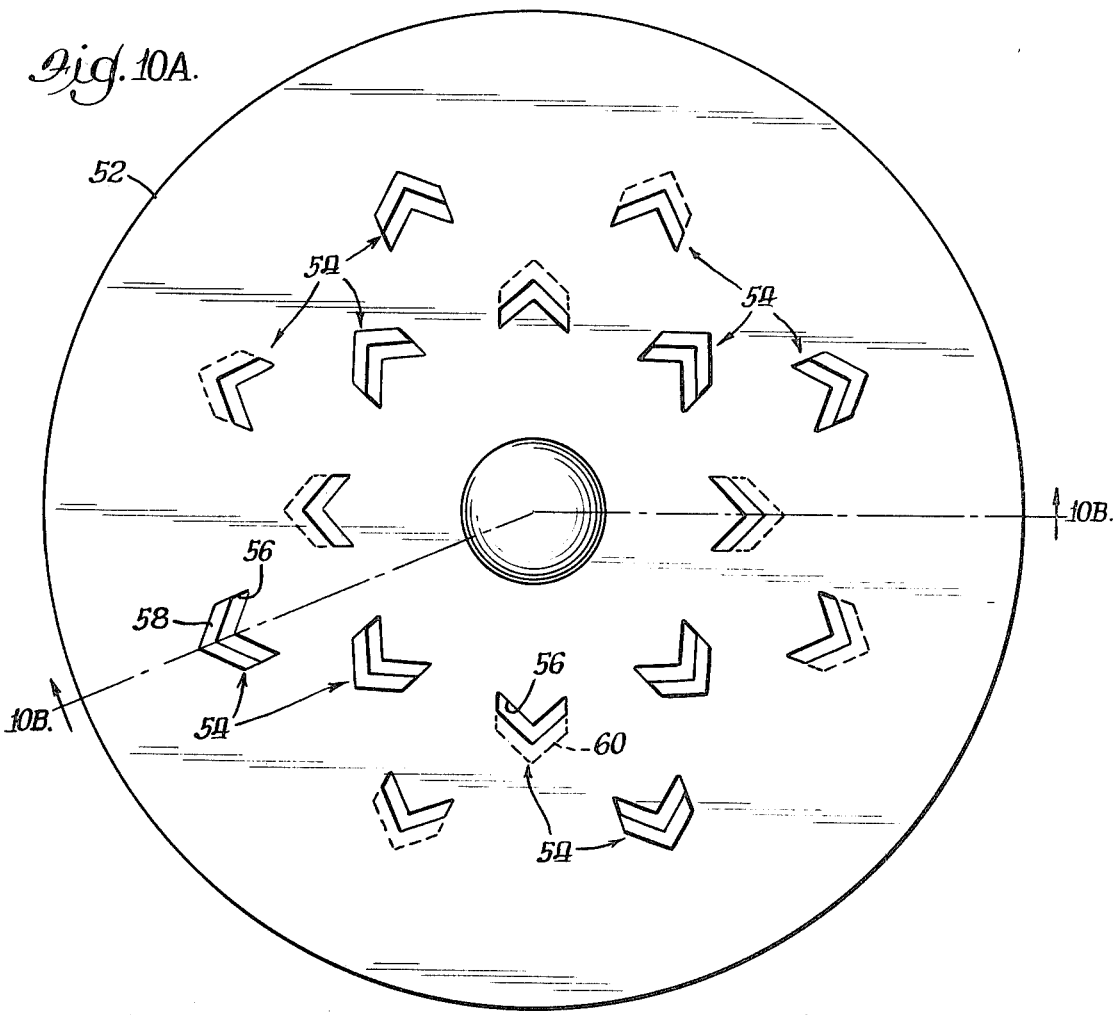
FIG. 10A is a top plan illustration of yet another alternative embodiment of the plate of FIG. 5.
Figure 10B:
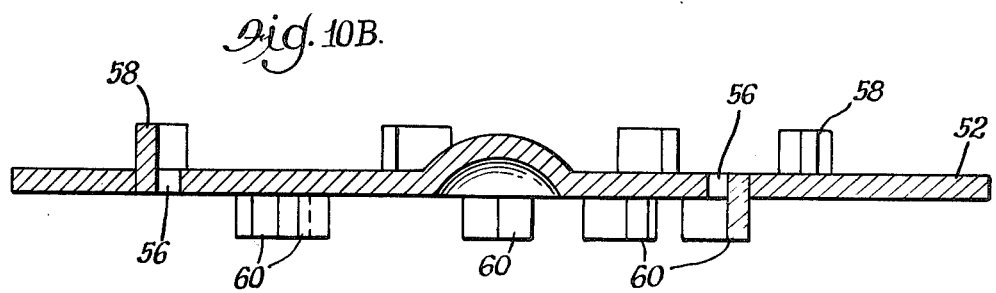
FIG. 10B is a cross-sectional view taken along lines 10B—10B of FIG. 10A.

When a series of springs are used in combination, such as illustrated in FIG. 4, and when plates having surface incongruities are employed in constructing the springs, it may be preferable in some embodiments to use a single such plate between adjacent springs rather than a pair of plates 26 as illustrated in FIG. 4. Thus the springs on opposite sides of that single plate would both be bonded thereto. The single plate would have incongruities which mechanically interengage both copolyester polymer elastomer springs between which it is located. In FIGS. 10A and 10B, I have illustrated another alternative configuration for obtaining surface incongruities in a single plate 52 which is formed especially to be placed between adjacent springs. The plate 52 has a series of angularly spaced surface incongruities 54 each comprising an aperture 56 and either an upstanding projection 58 or a downwardly depending projection 60. Since the plate 52 is particularly adapted to be employed between two adjacent springs, I preferably employ an equal number of the projections 58 and 60, radially and angularly spaced as shown in FIGS. 10A and 10B so that equal holding force is exerted by the plate on the adjacent springs. Although not illustrated, each of the projections 58 and 60 may be provided with perforations, such as the perforations 40 of FIGS. 9A and 9B, to enhance the mechanical lock.

When the plate 52 is used to construct a cushioning unit, the copolyester polymer elastomer of each spring flows into the apertures 56 and around the projections 58 and 60 to achieve a mechanical lock. The sides of the aperture and the projections 58 and 60 define steps or abutments in contact with the elastomeric springs.

Figure 11:
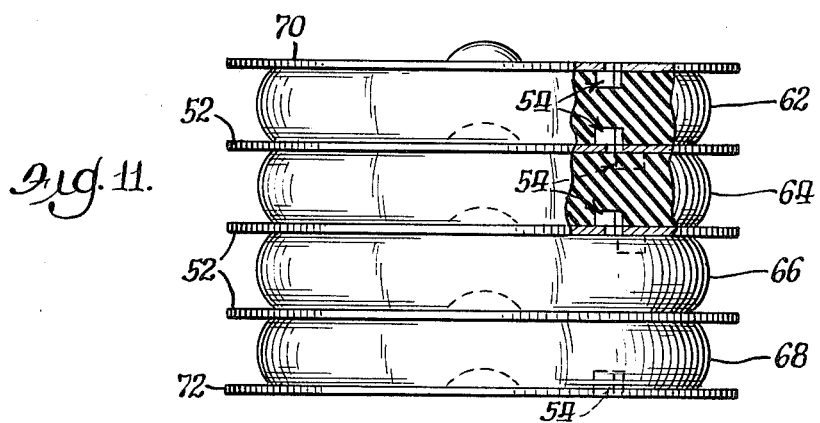
FIG. 11 is an elevational view of the resulting compression spring using the plate of FIGS. 10A and 10B.

FIG. 11 illustrates a multi-tiered compression unit composed of form springs 62, 64, 66 and 68. The upper spring 62 and lower spring 68 have respective metal plates 70 and 72 bonded thereto. These outer plates 70, 72 are formed with surface incongruities 54 on only one side thereof to obtain the mechanical lock with the elastomeric spring on that side.

Metal plates 52 are located between and bonded to adjacent springs 62, 64, 66 and 68. Each metal plate 52, as explained above with respect to FIGS. 10A and 10B, has a series of incongruities 54 engaging adjacent springs to facilitate a mechanical bond.

The metal plate 52 of FIGS. 10 and 11 is not limited to the particular form of surface incongruities shown. For example, alternative configurations, such as described with respect to FIGS. 5 through 9, could equally as well be employed in place of the incongruities 52. The embodiment of FIGS. 10 and 11 is illustrative only.

I claim:

1. A method of processing a block of a copolyester polymer elastomer of a given axial length to form a compression spring which spring when subsequently put into service as such will not suffer significant permanent deformation although a particular force is applied axially thereto which force is capable of compressing the spring by an amount greater than that which would normally result in a permanent deformation of its axial length, said method comprising the steps of:
   Annealing said block; and
   applying to said block an axial force sufficient to compress said block an extent of at least about fifty percent of said given axial length; and
   removing said axial force from said block.

2. A method as set forth in claim 1 and wherein said block has two faces generally normal to said axis, wherein said axial force is applied across the total area of each of said faces.

3. A compression spring produced by the method of claim 1.

4. A method as set forth in claim 1, wherein said annealing is carried out for a period of time in excess of fifty hours prior to said compression of said block.

5. A compression spring produced by the method of claim 4.

6. A method of making a compression unit employing the compression spring produced by the method as set forth in claim 1, said unit having a pair of plates, each plate positioned on a respective side of said compression spring, said method comprising the further steps of:
   forming said plates with surface incongruities at one face thereof which incongruities define steps angularly aligned with respect to said one face;
   locating the plates on respective sides of said compression spring with said one face of each plate against the compression spring to thereby form an assembly;
   applying to said assembly a second axial force sufficient to cause the copolyester polymer elastomer to flow about said incongruities to form a mechanical bond between said compression spring and said plates; and
   removing said second axial force from said assembly.

7. A compression spring unit produced by the method of claim 6.

8. A method as set forth in claim 6, wherein said second axial force is sufficient to compress said assembly to substantially the same thickness to which the block was compressed by the first mentioned axial force.

9. A method as set forth in claim 6, wherein in the course of forming said surface incongruities apertures are formed in said plates.

10. A method as set forth in claim 9, wherein in the course of forming said surface incongruities projections are formed extending outwardly from said one face of the plate.

11. A method as set forth in claim 6, wherein in addition to forming said surface incongruities, said face of each plate is roughened before said assembly is formed.

12. A method of making a multi-tiered compression spring assembly employing a plurality of compression springs produced by the method as set forth in claim 1, an end plate at one end of the assembly, an end plate at the other end of the assembly and an intermediate plate between each pair of adjacent compression springs, said method comprising the further steps of:
  forming said plates with surface incongruities on each face thereof which is in juxtaposition to one of said springs, said incongruities defining steps angularly aligned with respect to said face;
  positioning said multi-apertured plates and springs to form said compression spring assembly as aforesaid;
  applying to said assembly a second axial force sufficient to cause the copolyester polymer elastomer to flow about said incongruities to form a mechanical bond between said compression springs and said multi-apertured plates; and
  removing said second axial force from said assembly.

13. A compression spring assembly produced by the method of claim 12.

14. A method of making a compression unit comprising an elastomeric spring having two sides, and two plates each having a face abutting and bonded to a respective one of said sides, said method comprising the steps of:
  forming a block of an annealed copolyester polymer elastomer of a given length between said sides;
  forming said plates with surface incongruities at said face thereof which incongruities define steps angularly aligned with respect to said face;
  locating said plates on respective sides of said block with said face of each plate against said respective side to thereby form an assembly;
  applying to each of said plates a force in the direction of the other of the plates sufficient to compress said block to an extent of at least about fifty percent of said given length and to thereby cause the copolyester polymer elastomer to flow about said incongruities to form a mechanical bond between the elastomer and said plates; and
  removing said force from said plates.

15. A compression spring unit produced by the method of claim 14.

* * * * *